(12) United States Patent
Gao et al.

(10) Patent No.: US 8,114,470 B2
(45) Date of Patent: Feb. 14, 2012

(54) REDUCED SPACING RECORDING APPARATUS

(75) Inventors: Kaizhong Gao, Eden Praire, MN (US); Bin Lu, San Ramon, CA (US); Bogdan Florin Valcu, Fremont, CA (US); Xiaoding Ma, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 222 days.

(21) Appl. No.: 12/324,629

(22) Filed: Nov. 26, 2008

(65) Prior Publication Data

US 2010/0129685 A1    May 27, 2010

(51) Int. Cl.
  *B05D 5/12* (2006.01)
  *G11B 5/667* (2006.01)
  *G11B 5/72* (2006.01)

(52) U.S. Cl. ......... 427/131; 428/827; 428/829; 428/834

(58) Field of Classification Search .......................... None
See application file for complete search history.

(56) References Cited

U.S. PATENT DOCUMENTS

| | | | |
|---|---|---|---|
| 3,717,504 A * | 2/1973 | Aonuma et al. | 428/579 |
| 5,236,791 A * | 8/1993 | Yahisa et al. | 428/827 |
| 6,132,875 A * | 10/2000 | Kiuchi et al. | 428/408 |
| 6,777,112 B1 | 8/2004 | Girt et al. | |
| 6,914,749 B2 | 7/2005 | Chang et al. | |
| 7,060,376 B1 | 6/2006 | Chang et al. | |
| 7,201,977 B2 | 4/2007 | Li et al. | |
| 7,368,184 B2 * | 5/2008 | Kaizu et al. | 428/828 |
| 2003/0022025 A1 * | 1/2003 | Futamoto et al. | 428/694 TM |
| 2003/0235717 A1 * | 12/2003 | van de Veerdonk et al. | 428/694 TM |
| 2006/0029806 A1 * | 2/2006 | Hyodo et al. | 428/408 |
| 2006/0199043 A1 * | 9/2006 | Sugimoto et al. | 428/828.1 |
| 2006/0269797 A1 * | 11/2006 | Lu et al. | 428/834 |
| 2007/0287031 A1 | 12/2007 | Nolan et al. | |
| 2008/0096053 A1 | 4/2008 | Bian et al. | |

FOREIGN PATENT DOCUMENTS

JP          61099921 A   *   5/1986

OTHER PUBLICATIONS

Derwent Abstract of JP 61-099921-A (Derwent Acc No. 1986-166407). Patent published May 1986.*

* cited by examiner

Primary Examiner — Kevin Bernatz

(57) ABSTRACT

Aspects include recording media with enhanced areal density through reduction of head media spacing, head keeper spacing, or head to soft underlayer spacing. Such aspects comprise replacing currently non-magnetic components of devices, such as interlayers and overcoats with components and compositions comprising magnetic materials. Other aspects relate to magnetic seed layers deposited within a recording medium. Preferably, these aspects, embodied as methods, systems and/or components thereof reduce effective magnetic spacing without sacrificing physical spacing.

11 Claims, 6 Drawing Sheets

REDUCED SPACING RECORDING APPARATUS

BACKGROUND

1. Field

The following relates recording media with enhanced areal density, and more particularly to methods, systems and components that allow for reduced magnetic spacing through reduction of head media spacing, head keeper spacing, or head to soft underlayer spacing.

2. Related Art

Magnetic media are used in a variety of applications, predominantly in the computer and data storage industries, for example, in devices such as hard disk drives and other recording devices. Areal density, also called bit density, refers to the amount of data that can be packed onto a storage medium per unit area. Areal densities are generally measured in gigabits per square inch. Current magnetic and optical disks have areal densities of several gigabits per square inch. Efforts are being made to increase the areal recording densities of media to greater than 200 gigabits per square inch. In this regard, perpendicular recording media structures have been found to be superior to the more conventional longitudinal media in achieving high areal densities. Magnetic recording media are generally classified as "longitudinal" or "perpendicular" depending upon the orientation of the magnetic domains of the grains of magnetic material; the magnetic recording media of the present invention can include perpendicular recording media, longitudinal recording media, discrete track recording media, bit patterned media, or heat assisted magnetic recording (HAMR) media.

In perpendicular magnetic recording media (recording media with a perpendicular anisotropy in the magnetic layer), remanent magnetization is formed in a direction perpendicular to the surface of the magnetic medium, and the recorded bits are stored in a perpendicular, or out-of-plane, orientation in the recording layer.

In conventional thin-film type magnetic media, a fine-grained polycrystalline magnetic alloy layer serves as the active recording layer. Typically, recording media are fabricated with polycrystalline CoCr or CoPt-oxide containing films. Co-rich areas in the polycrystalline film are ferromagnetic while Cr or oxide rich areas in the film are non-magnetic. Magnetic interaction between adjacent ferromagnetic domains is attenuated by nonmagnetic areas in between.

High linear recording densities are obtainable by utilizing a "single-pole" magnetic transducer or "head" with perpendicular magnetic media. The write transducer or head can comprise a main (writing) pole as well as auxiliary poles and creates a highly concentrated magnetic field which alternates the media magnetization direction based on the bits of information to be stored. When the local magnetic field produced by the write transducer is greater than the coercivity of the material of the recording medium layer, the grains of the polycrystalline material at that location are magnetized. The grains retain their magnetization after the magnetic field applied thereto by the write transducer is removed. The direction of the magnetization matches the direction of the applied magnetic field. The magnetization of the recording medium layer can subsequently produce an electrical response in a read transducer, or read "head", allowing the stored information to be read.

A typical perpendicular recording system utilizes a magnetic medium with a relatively thick (as compared with the magnetic recording layer) "soft" magnetic underlayer (SUL), a relatively thin "hard" perpendicular magnetic recording layer, and a single-pole head. Magnetic "softness" refers to a magnetic material having a relatively low coercivity of about 2-150 oerstads (Oe) or preferably of about 1 kOe, such as of a NiFe alloy (Permalloy) or a material that is easily magnetized and demagnetized. The magnetically "hard" recording layer has a relatively high coercivity of several kOe, typically about 2-10 kOe or preferably about 3-8 kOe, and comprises, for example, a cobalt-based alloy (e.g., a Co-Cr alloy such as CoCrPtB or a material that neither magnetizes nor demagnetizes easily) having perpendicular anisotropy. The magnetically soft underlayer serves to guide magnetic flux emanating from the head through the hard, perpendicular magnetic recording layer. The system further preferably comprises a non-magnetic substrate, at least one non-magnetic interlayer, and an optional adhesion layer. The relatively thin interlayer comprised of one or more layers of non-magnetic materials, is preferably positioned below the at least one magnetically hard recording layer, and serves to prevent magnetic interaction between the soft underlayer and the magnetically hard recording layer and promote desired microstructural and magnetic properties of the hard recording layer. See US Publication No. 20070287031; U.S. Pat. Nos. 6,914,749; 7,201,977. The interlayer may comprise multiple layers forming an interlayer stack, with at least one of these layers preferably including an hcp (hexagonally close packed) material adjacent to the magnetically hard perpendicular recording layer.

Magnetic flux $\phi$ emanates from the main writing pole of the magnetic head, enters and passes through the at least one vertically oriented, magnetically hard recording layer in the region below the main pole, enters and travels within the SUL for a distance, and then exits therefrom and passes through the at least one perpendicular hard magnetic recording layer in the region below an auxiliary pole of the transducer head.

Granular perpendicular magnetic recording media is being developed for its capability of further extending the areal density of stored data, as compared to conventional perpendicular media, which is limited by the existence of strong lateral exchange coupling between magnetic grains. A granular (meaning that the in-plane grains are discontinuous in nature) perpendicular recording medium comprises a granular perpendicular magnetic layer having magnetic columnar grains separated by grain boundaries comprising voids, oxides, nitrides, non-magnetic materials, or combinations thereof. The grain boundaries, having a thickness of about 2 to about 20 angstroms (Å), provide a substantial reduction in the magnetic interaction between the magnetic grains. In contrast to conventional perpendicular media, wherein the perpendicular magnetic layer is typically sputtered at low pressures and high temperatures in the presence of an inert gas, such as argon (Ar), deposition of the granular perpendicular magnetic layer is conducted at relatively high pressures and low temperatures and utilizes a reactive sputtering technique wherein oxygen ($O_2$) and/or nitrogen ($N_2$) are introduced in a gas mixture of, for example, Ar and $O_2$, Ar and $N_2$, or Ar and $O_2$ and $N_2$. Alternatively, oxygen or nitrogen may be introduced by utilizing a sputter target comprising oxides and/or nitrides, which is sputtered in the presence of an inert gas (e.g., Ar), or, optionally, may be sputtered in the presence of a sputtering gas comprising $O_2$ and/or $N_2$ with or without the presence of an inert gas. The introduction of $O_2$ and/or $N_2$ provides oxides and/or nitrides that migrate into the grain boundaries can provide for a granular perpendicular structure having a reduced lateral exchange coupling between grains. See US Publication No. 20060269797. The introduction of such grain boundaries can increase the areal density of recording/storing media.

The interposition of the various layers within a medium described herein forms a stacked structure. The layer stack of the medium contains grain boundaries within the polycrystalline layers. Since a magnetically hard main recording layer is preferably epitaxially formed on the interlayer, the grains of each polycrystalline layer are of substantially the same width (as measured in a horizontal direction) and in vertical registry (i.e., vertically "correlated" or aligned). Completing the layer stack is a protective overcoat layer, such as of a diamond-like carbon (DLC), formed over the hard magnetic layer, and a lubricant topcoat layer, such as of a perfluoropolyether material, formed over the protective overcoat layer. The perpendicular recording medium may also comprise a seed layer which is preferably adjacent to the magnetically soft underlayer (SUL) and preferably comprises at least one of an amorphous material and a face-centered-cubic lattice structure (fcc) material. The term "amorphous" means that such a material exhibits no peak in an X-ray diffraction pattern as compared to background noise. Amorphous layers according to this invention may encompass nanocrystallites in amorphous phase or any other form of a material so long the material exhibits no peak in an X-ray diffraction pattern as compared to background noise. A seed layer seeds the nucleation of a particular crystallographic texture of the underlayer. Conventionally, a seed layer is the first deposited layer on the non-magnetic substrate. The role of this layer is to texture or align the crystallographic orientation of the subsequent Cr-containing underlayer. The seed layer, underlayer, and magnetic layer are conventionally sequentially sputter deposited on the substrate in an inert gas atmosphere, such as an atmosphere of argon.

Vertically stacked magnetic layers comprising a so-called "granular" recording layer (wherein the magnetic grains are only weakly exchange coupled laterally) and a continuous layer (wherein the magnetic grains are strongly exchange coupled laterally) are ferromagnetically coupled together in certain recording medium configurations. In such media, the entire continuous magnetic layer may couple with each grain in the granular magnetic layer (forming a vertically exchange coupled composite—"ECC"). See U.S. Pat. No. 7,201,977.

Very fine-grained magnetic recording media may possess thermal instability. One solution is to provide stabilization via coupling of the ferromagnetic recording layer with another ferromagnetic layer or an anti-ferromagnetic layer. This can be achieved by providing a stabilized magnetic recording medium comprised of at least a pair of ferromagnetic layers which are anti-ferromagnetically-coupled ("AFC") by means of an interposed thin, non-magnetic spacer layer. The coupling is presumed to increase the effective volume of each of the magnetic grains, thereby increasing their stability; the coupling strength between the ferromagnetic layer pairs being a key parameter in determining the increase in stability. A continuous ferromagnetic layer has a lower coercivity than that of a discontinuous ferromagnetic layer; a non-magnetic spacer layer provides magnetic or anti-ferromagnetic coupling between the continuous ferromagnetic layer and the discontinuous ferromagnetic layer depending upon its thickness. Preferably, the magnetic grains of the upper and lower magnetic layers are grown in vertical alignment and are equal or about equal in size; otherwise, the areas written in each of the pair of ferromagnetic layers may not coincide. U.S. Pat. No. 6,777,112.

The substrate is typically disk-shaped and may comprise glass, ceramic, glass-ceramic, NiP/aluminum, metal alloys, plastic/polymer material, ceramic, glass-polymer, composite materials non-magnetic materials, or a combination or a laminate thereof. See U.S. Pat. No. 7,060,376. A substrate material conventionally employed in producing magnetic recording rigid disks comprises an aluminum-magnesium (Al—Mg) alloy. Such Al—Mg alloys are typically electrolessly plated with a layer of NiP at a thickness of about 15 microns to increase the hardness of the substrates, thereby providing a suitable surface for polishing to provide the requisite surface roughness or texture. The optional adhesion layer, if present on the substrate surface, typically comprises a less than about 200 angstroms (Å) thick layer of a metal or a metal alloy material such as Ti, a Ti-based alloy, Ta, a Ta-based alloy, Cr, or a Cr-based alloy.

The relatively thick soft magnetic underlayer is typically comprised of an about 50 to about 300 nm thick layer of a soft magnetic material such as Ni, Co, Fe, an Fe-containing alloy such as NiFe (Permalloy), FeN, FeSiAl, FeSiAlN, a Co-containing alloy such as CoZr, CoZrCr, CoZrNb, or a Co—Fe-containing alloy such as CoFeZrNb, CoFe, FeCoB, and FeCoC. The relatively thin interlayer stack typically comprises an about 50 to about 300 Å thick layer or layers of non-magnetic material(s). The interlayer stack includes at least one interlayer of an hcp material, such as Ru, TiCr, Ru/CoCr$_{37}$Pt$_6$, RuCr/CoCrPt, etc., adjacent the magnetically hard perpendicular recording layer. When present, a seed layer adjacent the magnetically soft underlayer (SUL) may typically include a less than about 100 Å thick layer of an fcc material, such as an alloy of Cu, Ag, Pt, or Au, or an amorphous or fine-grained material, such as Ta, TaW, CrTa, Ti, TiN, TiW, or TiCr. The at least one magnetically hard perpendicular recording layer is typically comprised of an about 10 to about 25 nm thick layer(s) of Co-based alloy(s) including one or more elements selected from the group consisting of Cr, Fe, Ta, Ni, Mo, Pt, W, Cr, Ru, Ti, Si, O, V, Nb, Ge, B, and Pd.

Of the conventional media types described above, longitudinal media are more developed than perpendicular media and have been utilized for several decades in the computer industry. During this interval, components and sub-systems, such as transducer heads, channels, and media, have been repeatedly optimized in order to operate efficiently within computer environments. However, it is a common current belief that longitudinal recording is reaching the end of its lifetime as an industry standard in computer applications owing to physical limits which effectively prevent further increases in areal recording density.

Perpendicular media, on the other hand, are expected to replace longitudinal media in computer-related recording applications and continue the movement toward ever-increasing areal recording densities far beyond the capability of longitudinal media. However, perpendicular media and recording technology is less well developed than all facets of longitudinal media and recording technology. Specifically, each individual component of perpendicular magnetic recording technology, including transducer heads, media, and recording channels, is less completely developed and optimized than the corresponding component of longitudinal recording technology. As a consequence, the gains observed with perpendicular media and systems vis-à-vis the prior art, i.e., longitudinal media and systems, are difficult to assess.

High density perpendicular recording media require careful control and balance of several magnetic properties including: high enough anisotropy to enable thermal stability and compatibility with a high gradient head; low enough switching field to enable writability by the head; lateral exchange coupling low enough to maintain small correlation length between magnetic grains or clusters and high enough to maintain a narrow switching field distribution (SFD); and grainto-grain uniformity of magnetic properties sufficient to maintain thermal stability and minimize SFD.

As recording density continues to increase, it is necessary to make smaller grain structures to maintain the number of magnetic particles in a bit at a similar value. Smaller grain structures are more sensitive to non-uniformities such as anisotropy variations within grains, and also require higher anisotropy to maintain thermal stability, thus adversely affecting writability. Therefore, there is a need in the art for a media with improved writability and fewer defects for narrower SFD and improved uniformity of properties.

Current methods for enhancing areal density focus on manipulation and tweaking of elements within the magnetic recording layers of devices. However, head media spacing (HMS) (the distance between the magnetic writer head and the magnetic recording layer, excluding overcoats and lubricating coats on either head or recording layer) and head keeper spacing (HKS) (the gap between the writer air-bearing surface and the SUL) or head to SUL spacing are among the primary factors that limit areal density. As HMS/HKS is reduced, areal density increases. See FIG. 1. Every angstrom of reduction can be significant for increasing areal density. In the meantime, field gradient is also improved. However, it is very difficult to reduce HMS/HKS, and in recent years, the reduction of HMS/HKS has slowed down across the magnetic disk drive recording and storing industry.

One of the primary reasons for a limitation on areal density growth is that conventional scaling law cannot be maintained—in other words, the HMS/HKS cannot be scaled with reduction of head geometry. Further, a reduction of HMS/HKS physical spacing may not be desirable because of the advantages that an optimal amount of physical spacing may confer on the medium, such as functional perpendicular orientation, grain separation, and appropriate grain size in the magnetic recording layer.

SUMMARY

Aspects address optimizing areal densities of recording devices by overcoming current limitations on reduction of HMS, HKS or SUL while breaking scaling projection limits. Embodiments are directed media storage or recording devices (for example, perpendicular recording media, longitudinal recording media, discrete track recording media, bit patterned media, or heat assisted magnetic recording (HAMR) media) comprising a paramagnetic or ferromagnetic material as a replacement to current non-magnetic components of devices, for example, media overcoats, magnetic head overcoats, or interlayers. Preferably, during the recording process, the effective or magnetic HMS, HKS, or head to soft underlayer spacing is reduced without sacrificing physical spacing.

One embodiment is directed to a device for magnetic recording comprising a magnetic recording layer and a separate paramagnetic or ferromagnetic media overcoat on top of the magnetic recording layer. Preferably, the paramagnetic or ferromagnetic media overcoat comprises Fe, Co, Ni, C, Ni—Fe—C, Ni—Co—C or combinations thereof.

Another embodiment is directed to a device comprising a paramagnetic or ferromagnetic interlayer. Preferably, the paramagnetic or ferromagnetic interlayer is granular and comprises ruthenium (Ru), iron (Fe), cobalt (Co), nickel (Ni), carbon (C), a crystalline magnetic material, or combinations thereof. More preferably, the paramagnetic or ferromagnetic interlayer comprises a granular layer comprising Ru positioned between two granular layers each comprising RuCo, in a sandwich structure, wherein each of the two RuCo layers has a thickness of about 1-200 angstroms or about 100 angstroms, and wherein the Ru layer has a thickness of between about 0.1-100 angstroms or about 10 angstroms. Preferably, the Ru layer anti-ferromagnetically couples to one or both of the RuCo layers, and preferably each RuCo layer has a saturation magnetization ($M_s$) of about 100-1000 emu/cc or of greater than about 1000 emu/cc. Preferably, the device comprises a separate granular layer comprising Ru deposited over the sandwich structure and below the magnetic recording layer, and wherein the separate granular layer comprising Ru has a thickness of about 0-100 angstroms, 10-70 angstroms, or about 60 angstroms.

Another embodiment is directed to a device comprising a paramagnetic or ferromagnetic interlayer, a paramagnetic or ferromagnetic media overcoat, a paramagnetic or ferromagnetic head overcoat deposited over a surface of a magnetic writer, or a combination thereof, wherein said interlayer, media overcoat, and/or head overcoat has a saturation magnetization ($M_s$) of about 100-1000 emu/cc, greater than about 400 emu/cc, greater than about 500 emu/cc, greater than about 800 emu/cc, or greater than about 1000 emu/cc. Preferably, said paramagnetic or ferromagnetic interlayer has a thickness of about 1-1000 angstroms, about 1-500 angstroms, about 10-500 angstroms, about 100-500 angstroms, about 200-400 angstroms, or about 250-350 angstroms. Preferably, said paramagnetic or ferromagnetic media overcoat has a thickness of about 0.1-100 angstroms, or about 0.5-50 angstroms. Preferably, said paramagnetic or ferromagnetic head overcoat has a thickness of about 0.1-100 angstroms, or about 0.5-50 angstroms.

Another embodiment is directed to a device comprising a paramagnetic or ferromagnetic interlayer, a paramagnetic or ferromagnetic media overcoat, a paramagnetic or ferromagnetic head overcoat, or a combination thereof, wherein the device has a reduced effective magnetic spacing of head media spacing (HMS) or head keeper spacing (HKS) by about 0.1-100, 1-50 angstroms, 1-30 angstroms, 1-10 angstroms, or 10-20 angstroms, and an increased areal density, maximum write field, or field gradient as compared to a device without a paramagnetic or ferromagnetic media overcoat, a paramagnetic or ferromagnetic head overcoat, a paramagnetic or ferromagnetic interlayer, or a combination thereof. Preferably, the areal density is increased by about 5%, about 10%, about 15%, about 20%, or about 25% or more.

Another embodiment is directed to method of manufacturing a device for magnetic recording, the method comprising: depositing a soft magnetic underlayer (SUL) on a substrate; depositing a magnetic recording layer over the SUL; and depositing a paramagnetic or ferromagnetic media overcoat on top of the magnetic recording layer. Preferably, the method further comprises depositing a paramagnetic or ferromagnetic interlayer between the SUL and the magnetic recording layer. Preferably, the paramagnetic or ferromagnetic interlayer comprises a granular layer comprising Ru anti-ferromagnetically coupled to two granular layers each comprising RuCo, in a sandwich structure, wherein each of the two RuCo layers has a thickness of about 1-200 angstroms or about 100 angstroms, and wherein the Ru layer has a thickness of between about 0.1-100 angstroms or about 10 angstroms. Preferably, the method further comprises depositing a continuous seed layer containing tantalum (Ta), RuCr, a magnetic material, a polarized material, NiFe, Ni, palladium (Pd), platinum (Pt), rhodium (Rh), or a combination thereof below the paramagnetic or ferromagnetic interlayer but over the SUL, wherein the seed layer has a thickness of about 1-100 angstroms, about 50-100 angstroms, or about 60 angstroms.

Another embodiment is directed to a method comprising depositing a paramagnetic or ferromagnetic head overcoat over a surface of a magnetic writer. Preferably, the paramagnetic or ferromagnetic media overcoat, the paramagnetic or ferromagnetic interlayer, the paramagnetic or ferromagnetic head overcoat, or a combination thereof reduces effective magnetic spacing of head media spacing (HMS) or head keeper spacing (HKS) of the device by between 0.1 and 100 angstroms, and increases areal density of the device by about 10-25% as compared as compared to a device without a paramagnetic or ferromagnetic media overcoat, a paramagnetic or ferromagnetic interlayer, or a combination thereof.

Another embodiment is directed to a magnetic recording device manufactured by the method of any one or a combination of the methods according to such embodiments.

Other examples of embodiments and advantages are set forth in part in the description, which follows, and in part, may be obvious from this description, or may be learned from the practice thereof. However, no limitation is intended by setting forth such examples.

DETAILED DESCRIPTION

One embodiment is directed to a unique media design that enables a reduction in magnetic spacing by introducing a higher permeability material than the materials commonly used into the interlayer, lubricant, media magnetic layer overcoat, magnetic writer head overcoat, or combinations thereof. Preferably, magnetic spacing reduction is reduced without a physical reduction in spacing. The higher permeability material may comprise a ferromagnetic material, a paramagnetic material, or a combination thereof.

Figure 1:
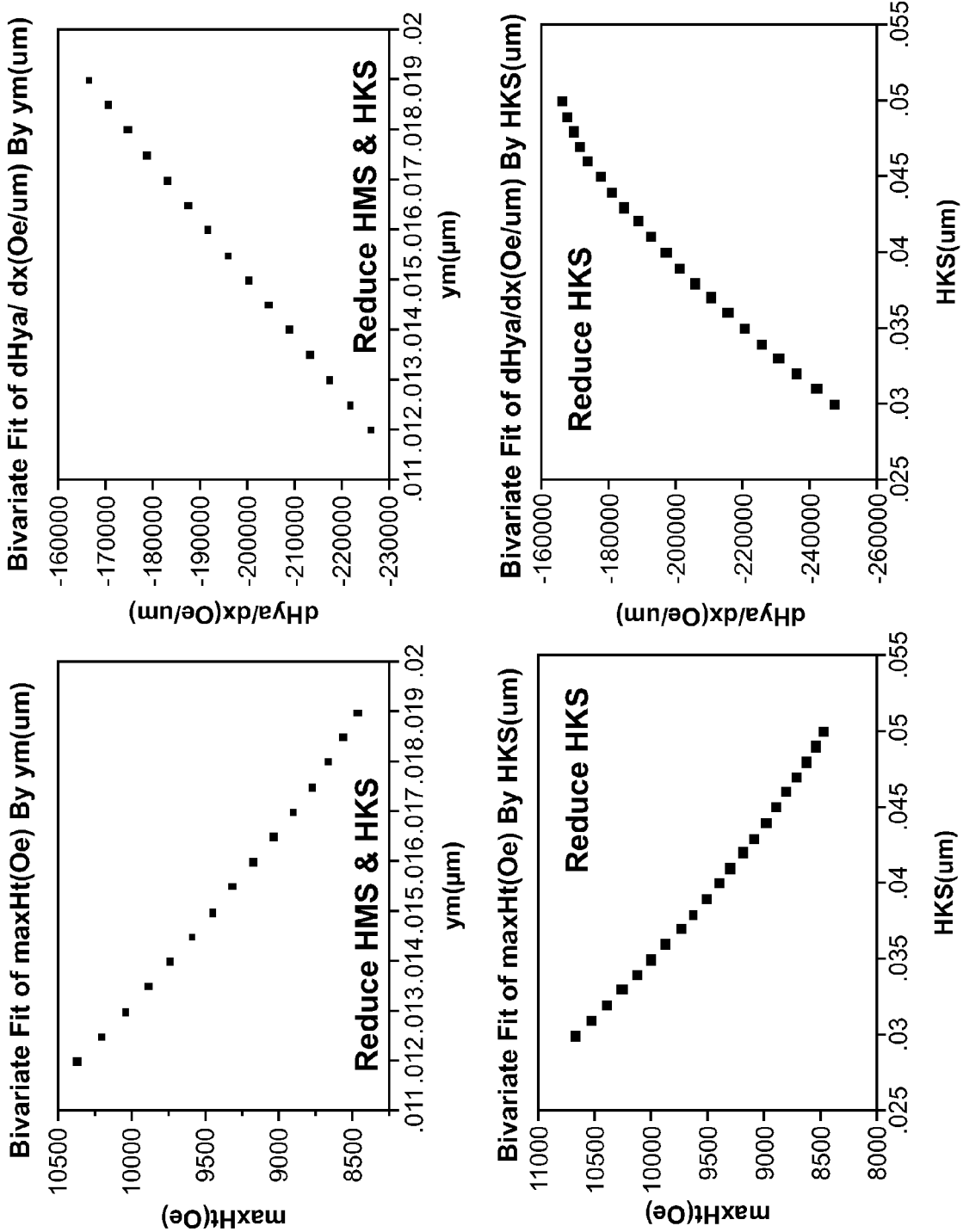
FIG. 1 shows finite element method (FEM) simulation results on the sensitivity of HMS/HKS. The results show that a reduction in HMS/HKS leads to an increase in maximum write field and field gradient. The recording head geometry, magnetic parameters of the head and the media are all the same during these simulations; only the HMS/HKS values are changed.
Figure 2A:
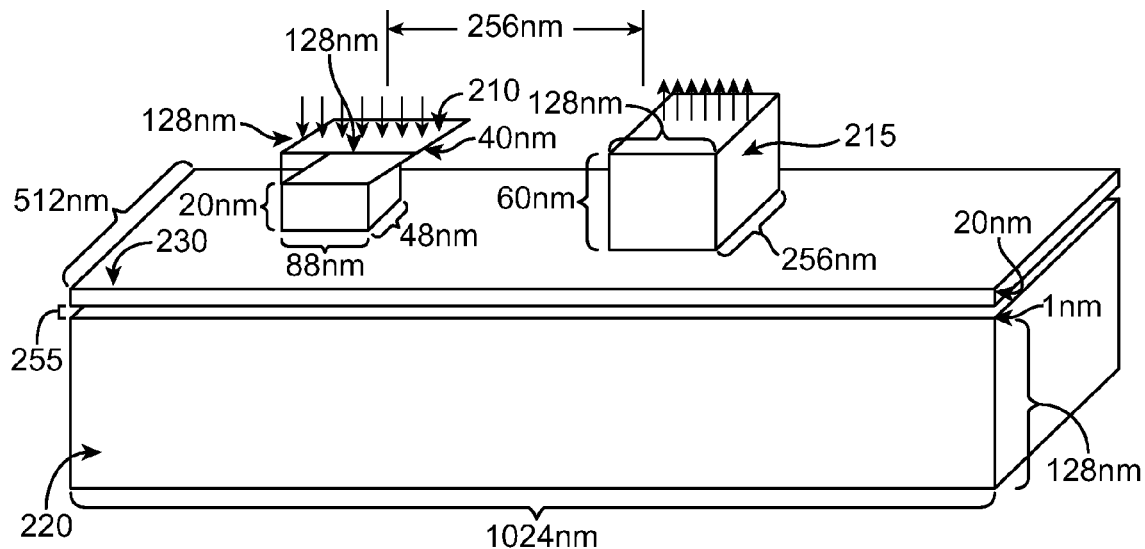
FIG. 2(a) depicts a micromagnetic simulation model for a perpendicular recording system. The model includes a single pole head with a shield pole, a media magnetic layer and an SUL, and takes into consideration typical fields to which the medium is subjected including an applied (external) field, a crystalline anisotropy field, a magnetostatic field and an exchange field.
Figure 2B:
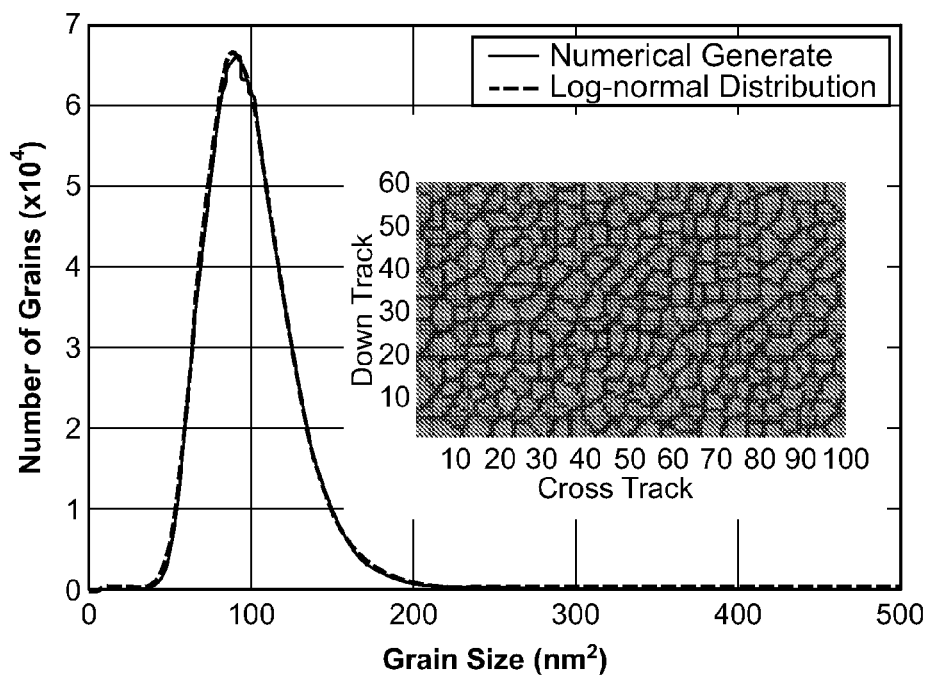
FIG. 2(b) depicts grain size distributions and $H_k$ magnitude distributions through the log-normal distribution; and depicts $H_k$ angle distributions via a 5° angle.

The reduction in spacing achieved refers to a reduction in effective magnetic spacing, which is calculated by dividing physical spacing by permeability. The magnetic spacing perceived by a writer and/or a reader thus depends on physical spacing (or physical thickness) of the layers or space measured divided by the relative magnetic permeability of the layers or space in question. Permeability is related to the moment of a material, and a material with a higher moment has a higher permeability. Preferably, physical spacing (as opposed to effective magnetic spacing) is not reduced in embodiments of the recording medium device so as to preserve physical spacing-dependent parameters, such as functional perpendicular orientation, grain separation, and appropriate grain size in the magnetic recording layer FIGS. 2(a)-(b) show a micromagnetic simulation model for a prior art perpendicular recording system. The problems studied through this model formulated in typical problem geometry (including a media magnetic layer 230, a single pole head 210 with shield pole 215, an SUL 220, and an interlayer 255) are the effect of medium permeability, perpendicular medium switching speed, the effects of grain size, medium angle and anisotropy (Hk) distributions, and transition parameters under dynamic switching. The model takes into account an applied external field (from the magnetic writer head), a crystalline anisotropy field (each material's intrinsic anisotropy field), a magnetostatic field, and an exchange field (the field between the grains).

Figure 3:
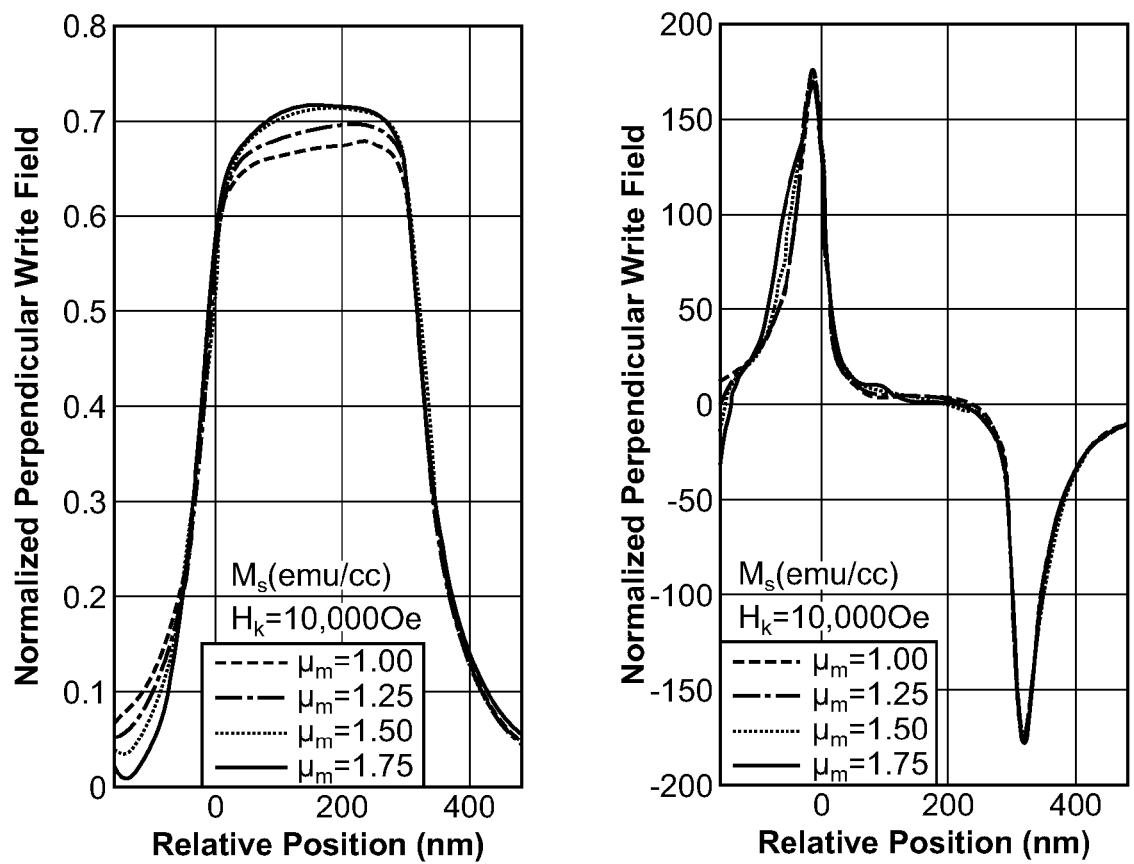
FIG. 3 shows the effect of medium/interlayer permeability, including an improvement in the perpendicular write field as the media/interlayer permeability increases.

It was surprisingly discovered that ferromagnetic, paramagnetic, or polarized materials employed in the place of non-magnetic components as current in the prior art optimizes writability and enhances areal density. Non-magnetic materials are commonly used for the prior art interlayer to prevent magnetic interaction between the soft underlayer and the magnetically hard recording layer and to promote desired microstructural and magnetic properties of the hard recording layer. However, FIG. 3 illustrates that as the interlayer's permeability increases, the write field is improved. In this model, the medium has been normalized for saturation magnetization and anisotropy at 10,000 Oe. There is no field gradient penalty in this approach.

The increase in permeability allows for effective magnetic spacing (such as HKS, HMS or head to SUL spacing) to be reduced without affecting actual physical spacing. Media devices may have a specific budget, or allocation, for HKS, HMS, "head to SUL" physical spacing. The reason that physical spacing is often desirably not sacrificed (or reduced) is that various sublayers in the interlayers provide advantages including, but not limited to, good perpendicular orientation, well grain separation, and appropriate grain size, for the magnetic recording layer.

The interlayer, media head overcoat and disc or media overcoat (e.g. a carbon overcoat [COC]) are typically the major physical thickness contributors to spacing in media. Altitude, temperature and humidity also affect physical spacing. By replacing one or a combination of the currently non-magnetic components of media devices with a relatively more highly permeable material (such as a paramagnetic or a ferromagnetic material according to embodiments of the invention), effective magnetic spacing is reduced, and areal density is increased, while physical spacing is desirably not sacrificed. In one embodiment, the material of a conventional disc overcoat, disc lube, head overcoat, interlayer, or a combination thereof, is replaced with a highly permeable or magnetic material. Preferably, the net effect is a reduction in effective magnetic spacing (physical spacing divided by relative permeability) without a reduction in physical spacing in terms of HMS, HKS and head to SUL spacing. The impact of improved medium and/or interlayer permeability is illustrated in FIG. 3. As media/interlayer permeability increases, the perpendicular write field is improved.

One embodiment is directed to a recording device comprising a magnetic writer and a recording medium, the recording medium comprising a magnetic recording layer (preferably comprising a media hard layer) and a separate paramagnetic or ferromagnetic media overcoat on top of the media magnetic layer. Preferably, the paramagnetic or ferromagnetic overcoat comprises a lubricant. More preferably, the magnetic overcoat is corrosion-protective. A corrosion-protective layer may additionally or alternatively be deposited between the magnetic recording layer and the magnetic overcoat. Further, a corrosion-protective layer may preferably replace a top portion of the magnetic recording layer or another component of the recording medium. Corrosion-protective materials incorporated into device components include, but are not limited to, iron, nickel, cobalt, carbon, or combinations thereof. The paramagnetic or ferromagnetic media overcoat may comprise iron (Fe), cobalt (Co), nickel (Ni), carbon (C), Ni—Fe—C, Ni—Co—C, or combinations thereof, and may have a thickness of about 0.1-100 angstroms, or about 0.5-50 angstroms.

In another embodiment, a paramagnetic or ferromagnetic media overcoat replaces a disc lube, a carbon overcoat, a diamond-like carbon overcoat, a portion or portions thereof, or combinations thereof, in the device. The paramagnetic or ferromagnetic media overcoat preferably has saturation magnetization ($M_s$) of about 100-1000 emu/cc, greater than about 400 emu/cc, greater than about 500 emu/cc, greater than about 800 emu/cc, or greater than about 1000 emu/cc. Another embodiment is directed to a paramagnetic or ferromagnetic writer head overcoat. This head overcoat can be used alone or in combination with paramagnetic or ferromagnetic material substitutions according to the various embodiments of this invention to reduce effective magnetic spacing of recording media devices.

The paramagnetic or ferromagnetic media or head overcoat may comprise carbon in proportions including 1-20%, 20%-80%, 50%-90%, or more than 90%. In one embodiment, the paramagnetic or ferromagnetic media overcoat comprises carbon of a concentration graded across the vertical thickness of the overcoat, wherein the carbon concentration is higher toward a surface of the magnetic writer than toward a surface of the media hard layer. In another embodiment, the concentration of carbon is graded in the opposite direction, with the highest concentration present toward the bottom of the recording media (in other words, toward the SUL) and the lowest concentration present toward the surface of the recording media facing the magnetic writer head.

Preferably, the paramagnetic or ferromagnetic media overcoat and/or head overcoat reduces the magnetic spacing of head media spacing (HMS), head keeper spacing (HKS), head to SUL spacing, or combinations thereof, of a media recording device, as compared to a device without a paramagnetic or ferromagnetic media and/or head overcoat. Such magnetic spacing reduction is preferably more than about 0.1, more than about 0.5, more than about 1, more than about 2, more than about 5, more than about 10 angstroms, more than about 20 angstroms, more than about 30 angstroms, or more than about 50 angstroms. Preferably, the paramagnetic or ferromagnetic media and/or head overcoat increases areal density, maximum write field, field gradient, or combinations thereof, of a media recording device, as compared to a device without a magnetic overcoat. In one embodiment, areal density is increased by about 5%, about 10%, about 15%, about 20%, about 25% or by more than about 30%.

Another embodiment is directed to a recording medium comprising a paramagnetic or ferromagnetic interlayer, preferably deposited above the SUL. Preferably, the paramagnetic or ferromagnetic interlayer sits below the magnetic recording layer. Preferably, the paramagnetic or ferromagnetic interlayer is granular. The paramagnetic or ferromagnetic interlayer may comprise ruthenium (Ru), Fe, Co, Ni, C, or combinations thereof. In certain embodiments, the paramagnetic or ferromagnetic interlayer comprises a crystalline magnetic material. Preferably, it contains three layers of nano-crystalline films. In one embodiment, a paramagnetic or ferromagnetic interlayer is deposited in a recording medium while conventional media hard layer(s) are utilized, with or without a conventional media overcoat. In another embodiment, both a paramagnetic or ferromagnetic media overcoat and a paramagnetic or ferromagnetic interlayer according to embodiments of the invention are positioned in a recording device. Preferably, a paramagnetic or ferromagnetic head overcoat is also employed.

The material of the paramagnetic or ferromagnetic interlayer preferably has a saturation magnetization ($M_s$) of about 100-1000 emu/cc, greater than about 400 emu/cc, greater than about 500 emu/cc, greater than about 800 emu/cc, or greater than about 1000 emu/cc. The paramagnetic or ferromagnetic interlayer may have a thickness of about 1-1000 angstroms, about 1-500 angstroms, about 10-500 angstroms, about 100-500 angstroms, about 200-400 angstroms, or about 250-350 angstroms.

One embodiment is directed to a recording device comprising an SUL preferably separated into two areas by a continuous anti-ferromagnetically coupled (AFC) layer comprising Ru. Preferably each of those two SUL areas comprises an amorphous FeCo-alloy, and, preferably, each of the two separate areas has a thickness of about 1-400 angstroms, about 10-300 angstroms, about 100-300 angstroms, or about 200 angstroms. Preferably, the continuous AFC layer comprising Ru has a thickness of about 1-100 angstroms, about 1-50 angstroms, about 1-30 angstroms, about 10-30 angstroms, or about 10 angstroms.

In another embodiment, the recording device comprises a paramagnetic or ferromagnetic interlayer made up of a layer containing Ru sandwiched between two layers each comprising RuCo. The RuCo layer preferably comprises more than 50% Co, more than 75% Co, more than 90% Co, or more than 99% Co. Each of the two RuCo layers preferably has a thickness of about 1-200 angstroms, more preferably about 50-150 angstroms, most preferably of about 100 angstroms. The Ru layer is preferably granular and has a thickness of between about 0.1-100 angstroms, more preferably of about 10 angstroms, and preferably anti-ferromagnetically couples to either one or both of the RuCo layers.

Preferably, each RuCo layer has a saturation magnetization ($M_s$) of about 100-1000 emu/cc or of greater than about 1000 emu/cc, and is preferably granular.

In a further embodiment, a separate granular layer comprising Ru is deposited over the RuCo—Ru—RuCo sandwich structure and below the magnetic recording media (preferably comprising a media hard layer). Preferably, this separate Ru layer has a thickness of about 0-100 angstroms, 10-70 angstroms, or about 60 angstroms.

Another embodiment is directed to a recording device comprising a continuous seed layer deposited over the SUL. Preferably, this seed layer is deposited below a paramagnetic or ferromagnetic interlayer according to various embodiments of this invention. The seed layer preferably comprises a magnetic material, a polarized material, tantalum (Ta), RuCr, NiFe, Ni, palladium (Pd), platinum (Pt), rhodium (Rh), or a combination thereof. In one embodiment, the seed layer is placed below a RuCo-Ru-RuCo sandwich structure as described herein. Preferably, the seed layer has a thickness of about 1-100 angstroms, about 50-100 angstroms, or about 60 angstroms.

In another embodiment, the seed layer comprises a magnetic material, a polarized material, or a combination thereof. Preferably, the material of the seed layer comprises NiFe, Ni, palladium (Pd), platinum (Pt), rhodium (Rh), or combinations thereof.

The RuCo—Ru—RuCo sandwich structure disclosed herein preferably reduces noise from the SUL as compared to a recording device without a sandwich structure comprising layers containing Ru and Co. The paramagnetic or ferromagnetic interlayer according to embodiments of the invention preferably reduces noise from the SUL as compared to a recording device without a paramagnetic or ferromagnetic interlayer.

Preferably, the paramagnetic or ferromagnetic interlayer reduces the magnetic spacing of head media spacing (HMS), head keeper spacing (HKS), head to SUL spacing, or combinations thereof, of a media recording device, as compared to a device without a paramagnetic or ferromagnetic interlayer. Such effective magnetic spacing reduction is preferably more than about 0.1, more than about 0.5, more than about 1, more than about 2, more than about 5, more than about 10 angstroms, more than about 20 angstroms, more than about 30 angstroms, or more than about 50 angstroms. Preferably, the magnetic interlayer increases areal density, maximum write field, field gradient, or combinations thereof, of a media recording device, as compared to a device without a magnetic interlayer. In one embodiment, areal density is increased by about 5%, about 10%, about 15%, about 20%, about 25% or by more than about 30%.

The following disclosure provides examples implementing these aspects, and are neither exhaustive of possible implementations nor limiting.

EXAMPLES

Example 1

An Ni—C composite film, or a magnetic media overcoat (101) is deposited on the magnetic recording layer (103), preferably comprising a media hard layer in a recording device; preferably, the magnetic overcoat (101) replaces a currently standard diamond-like carbon (DLC) overcoat. See FIG. 4. Preferably, as in the embodiment illustrated in this figure, an overcoat (102) comprising a material having a relatively high permeability is applied to a surface of the magnetic writer head. The result is that effective magnetic HKS and HMS are reduced, while physical spacing is not changed over a prior art device not comprising a ferromagnetic or paramagnetic overcoat on the recording media layer and/or on the magnetic writer head. The magnetic Ni—C film of this embodiment magnetically reduces the overcoat (101) thickness effectively. HKS (106) and HMS (107) are also indicated in FIGS. 5-7.

Paramagnetic or ferromagnetic media or head overcoats or protective films may also comprise comprises Ni—Fe—C, Ni—Co—C, Ni, Co, Fe or combinations thereof. The percentage of carbon in the film or overcoat is preferably about 50-90% with a thickness of about 0.5 Å-50 Å. Preferably, the recording device further comprises an interlayer (104) and an SUL (105).

Figure 4:
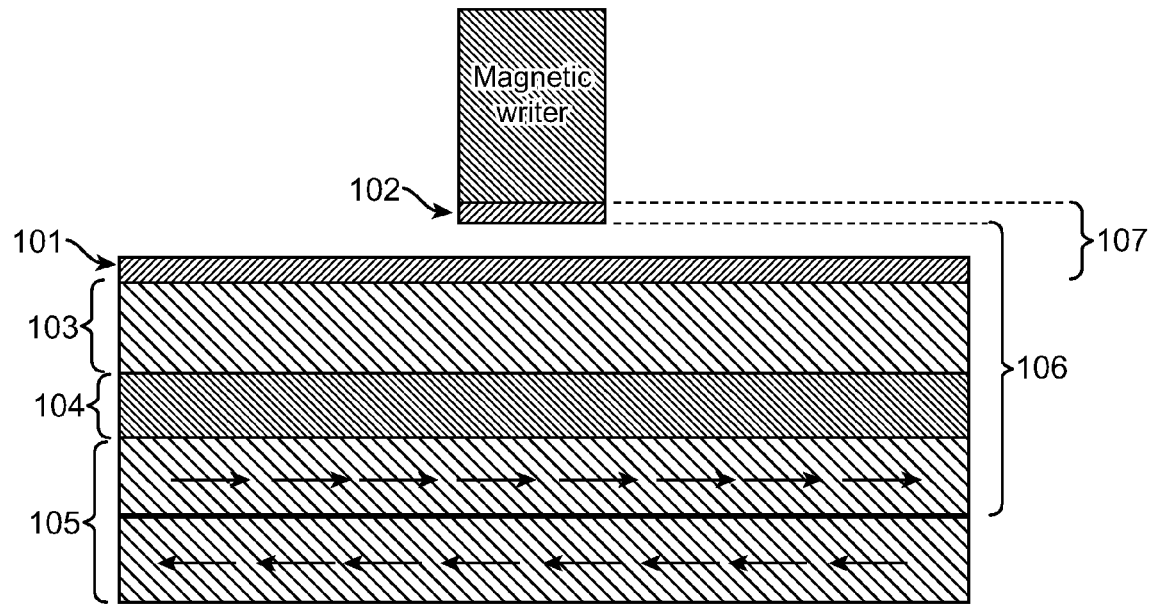
FIG. 4 schematically depicts one embodiment of the current invention. The overcoat of the magnetic recording layer is based on magnetic material.
Figure 5:
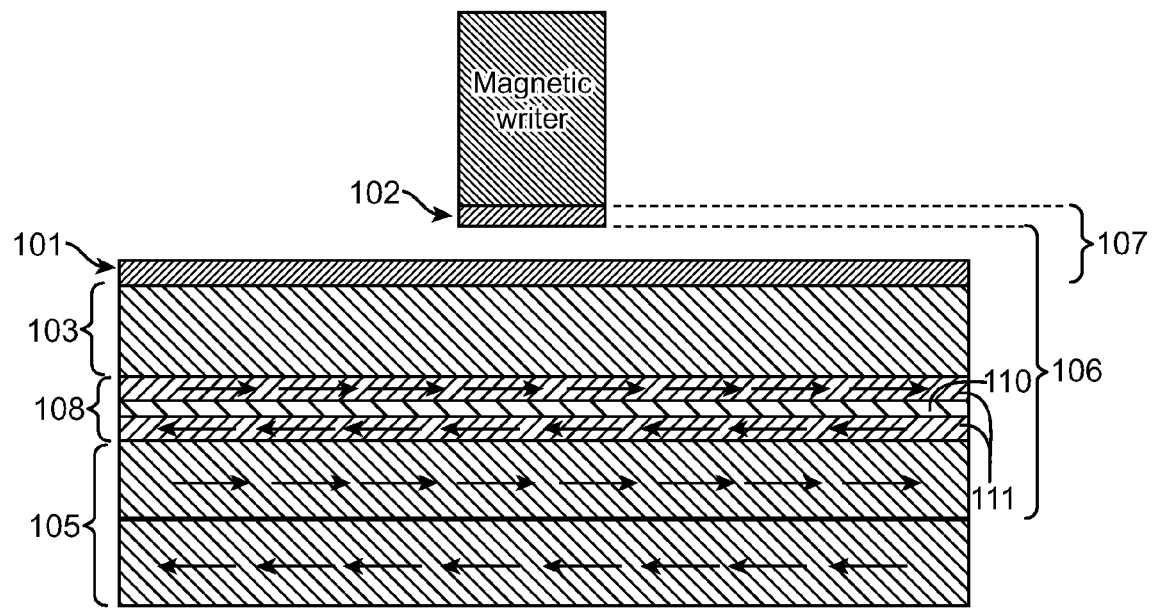
FIG. 5 schematically depicts one embodiment of the current invention. The overcoat of the magnetic recording layer is based on magnetic material. The interlayer is made of crystalline magnetic material.
Figure 6:
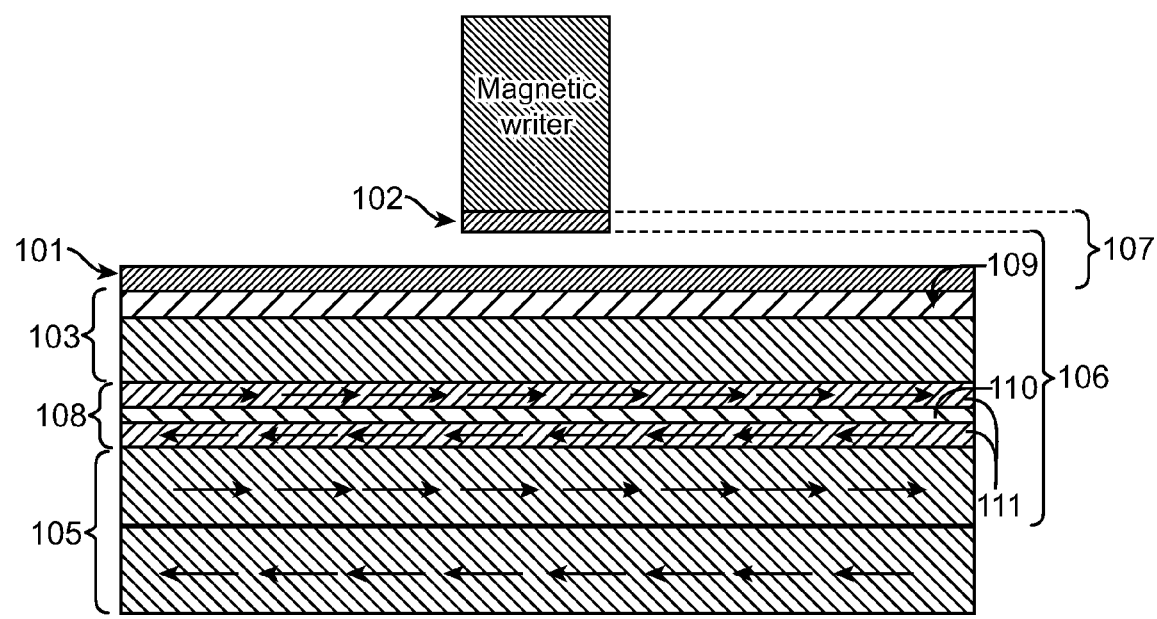
FIG. 6 schematically depicts one embodiment of the current invention comprising the top part of the magnetic layer replaced by a corrosion-protective magnetic layer.
Figure 7:
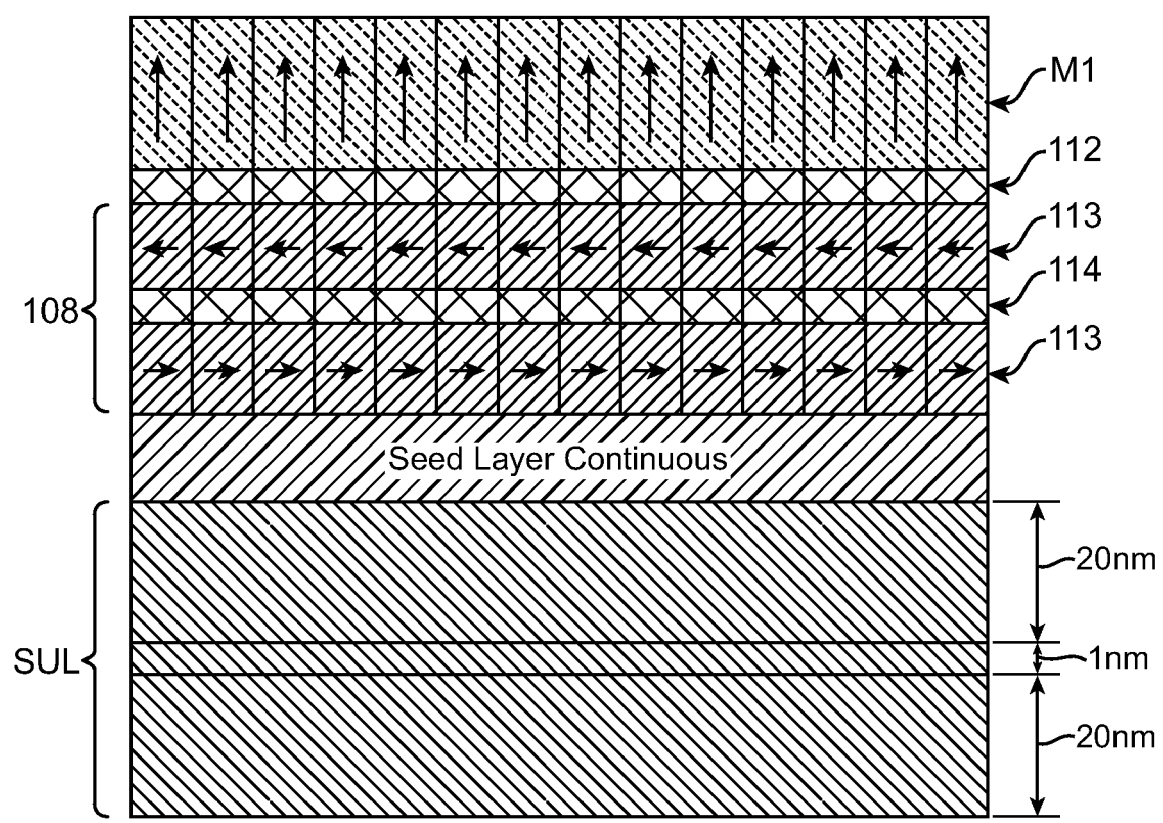
FIG. 7 shows a schematic diagram of one embodiment comprising RuCo/Ru/RuCo granular sandwiched interlayer, also comprising a continuous seed layer and an SUL.

The horizontal arrows in FIGS. 4-7 indicate anti-parallel magnetic fields in an SUL (105) dual layer AFC structure (FIGS. 4, 5 and 6) and in an AFC granular interlayer (108) composed of multiple layers (FIGS. 5, 6 and 7). The anti-parallel fields allow the device to be in equilibrium—in other words, in a noise-free state. The vertical arrows in FIG. 7 indicate the path of the magnetic flux φ. In one embodiment, magnetic flux φ emanating from a single pole of single-pole magnetic transducer head enters and passes through hard magnetic recording layer (103) in the region below the single pole, enters and travels within the soft magnetic underlayer (105) for a distance, and then exits the SUL (105), passing through the preferably at least one perpendicular hard magnetic recording layer within the magnetic recording layer (103) in the region below an auxiliary pole of single-pole magnetic transducer head.

Example 2

In the example illustrated in FIG. 5, structures analogous to those that appear in FIG. 4 are shown, with the further replacement of a conventional interlayer (104) with a magnetic interlayer (108) comprising RuCo and Ru. In this embodiment, a Ru-containing layer (110) is preferably sandwiched by two RuCo-containing layers (111). All three layers are preferably nano-crystalline films. The Co composition in the RuCo alloy is preferably between about 50% and 100%. The thickness of RuCo film is preferably from about 10 Å to about 200 Å. The thickness of the Ru film is preferably from about 0.1 Å to about 20 Å.

Example 3

FIG. 6 shows another embodiment comprising a RuCo (111)/Ru (110)/RuCo (111) granular sandwiched magnetic interlayer (108), with structures analogous to those illustrated in FIG. 5. In this embodiment, a corrosion-protective top maglayer (109), preferably comprising a Ni—C composite film, is used as a replacement for an upper portion of the magnetic recording layer, or as a separate top layer of the magnetic recording layer. The magnetic recording layer preferably also comprises at least on media hard layer.

Current designs employ magnetic layers having a continuous top layer comprising CoCrPt-alloys, and the magnetic layers are not corrosion-protective. One embodiment of the present invention employs an Ni—C base composite film having an $M_s$ of greater than about 100 emu/cc, preferably greater than about 400 emu/cc, more preferably greater than about 500 emu/cc, more preferably greater than about 800 emu/cc, or more preferably greater than 1000 emu/cc to replace the CoCrPt-alloys. Preferably, the carbon composition is about 20%-80%. In one embodiment, the carbon composition is graded across the thickness of the layer with the top surface having a higher C %. Other composite films comprising Fe, Ni, Co, C are also proposed. Such corrosion-protective composite films are preferably comprised within the magnetic overcoat, or more preferably, comprise a separate layer disposed over the media hard layer. Preferably, a corrosion-protective composite film replaces the top part of the media hard layer; more preferably, the corrosion-protective composite film is placed between the media hard layer and a paramagnetic or ferromagnetic overcoat according to embodiments of this invention.

A recording medium according to one embodiment preferably also comprises a magnetic overcoat (101) and either the magnetic interlayer (108) illustrated in FIGS. 5 and 6, or a conventional non-magnetic interlayer (104) as illustrated in FIG. 4.

Example 4

In the example illustrated in FIG. 7, the magnetic interlayer (108) comprises a Ru layer (114) anti-ferromagnetically coupled (AFC) to two granular RuCo films (113) sandwiching it on either of its sides. This AFC coupling design is different from current designs employing which utilize a single RuCo-containing granular "SMILE" (soft magnetic interlayer equivalent) layer due to its multi-layer structure. The AFC design according to this embodiment of the invention preferably reduces the noise from the soft-magnetic interlayer as compared with a recording medium utilizing a single layer of RuCo. The RuCo layer preferably has a saturation magnetization ($M_s$) of about 100-1000 emu/cc.

Each of the two RuCo layers (113) is preferably about 100 Å thick; the Ru AFC granular layer (114) in between the two RuCo layers (113) is preferably 10 Å thick. On top of the RuCo/Ru/RuCo stack of layers, there is preferably a separate granular Ru layer 112 that separates the magnetic recording layer (which is indicated as "M1") from the magnetic interlayer preventing problems caused by the exchange coupling between the two layers. The magnetic recording layer (having a thickness that is approximately 20 nm, or about 200 angstroms, in this embodiment), preferably comprises a media hard layer, and more preferably further comprises a media soft layer, a paramagnetic or ferromagnetic media overcoat, a corrosion-protective layer, a lubricating layer, or combinations thereof. The separate granular Ru layer 112 is preferably about 0-100 Å thick, more preferably about 10-70 Å thick, more preferably about 60 Å.

In another embodiment, below the RuCo/Ru/RuCo sandwiched layers and above the SUL, there is a continuous seed layer, preferably comprising Ta/RuCr, which is about 1-100 Å thick, preferably about 60 Å thick. In another embodiment, the SUL, preferably comprising amorphous FeCo-alloy, is separated about midway into two separate layers by a layer comprising continuous AFC Ru. Preferably, the two FeCo layers are each about 200 Å, while the Ru AFC layer between them is preferably about 1-100 angstroms, about 1-50 angstroms, about 1-30 angstroms, about 10-30 angstroms, or, more preferably, about 10 angstroms.

Embodiments of the invention such as those illustrated in FIG. 7 physically maintain physical interlayer thickness, while magnetically reducing that effective thickness.

Example 5

To further reduce the magnetic thickness of the interlayer, paramagnetic or ferromagnetic materials or polarized materials are used in certain embodiments. Preferably, these materials are selected from a group consisting of NiFe, Ni, Pd, Pt, Rh, and combinations thereof. Such magnetic or polarized materials are further preferably comprised in a seed layer between SUL and magnetic interlayers. This is different from current designs employing "soft magnetic interlayer equivalent" ("SMILE") because of at least the added polarized materials (Pt, Rh, Pd, etc.).

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. The term comprising as used throughout this application includes the more limiting terms and phrases "consisting essentially of" and "consisting." It is intended that the specification and examples be considered exemplary only with the true scope and spirit of the invention indicated by the following claims.

The invention claimed is:
1. A method comprising:
depositing a soft magnetic underlayer (SUL) on a substrate;
depositing a magnetic recording layer over the SUL; and
depositing a ferromagnetic overcoat on top of the magnetic recording layer, wherein:
a protective overcoat layer or a lubricant layer does not overlie the ferromagnetic overcoat, and
depositing the ferromagnetic overcoat comprises depositing the ferromagnetic overcoat comprising a saturation magnetization (Ms) of about 100-1000 emu/cc.
2. The method of claim 1, wherein the ferromagnetic overcoat reduces effective magnetic spacing of head media spacing (HMS) or head keeper spacing (HKS) of the device by between 0.1 and 100 angstroms, and increases areal density of the device by about 10-25% as compared to a device that does not employ a ferromagnetic overcoat.
3. The method of claim 1, wherein the ferromagnetic overcoat comprises carbon of a concentration graded across the vertical thickness of the ferromagnetic overcoat, wherein the carbon concentration is higher toward an upper surface of the ferromagnetic overcoat than toward a surface of the magnetic recording layer.
4. The method of claim 1 wherein the ferromagnetic overcoat comprises Ni—Fe—C or Ni—Co—C.
5. A method comprising:
depositing a soft magnetic underlayer (SUL) on a substrate;
depositing a perpendicular magnetic recording layer over the SUL; and
depositing a ferromagnetic media overcoat overlying the magnetic recording layer, wherein:
a protective overcoat layer or a lubricant layer does not overlie the ferromagnetic media overcoat, and
depositing the ferromagnetic media overcoat comprises depositing the ferromagnetic media overcoat comprising a saturation magnetization (Ms) of about 100-1000 emu/cc.
6. The method of claim 5, wherein the ferromagnetic media overcoat reduces effective magnetic spacing of head media spacing (HMS) or head keeper spacing (HKS) of a perpendicular magnetic recording device by between 0.1 and 100 angstroms, and increases areal density of the device by about 10-25% as compared to a perpendicular magnetic recording device that does not employ a ferromagnetic media overcoat.
7. The method of claim 5, wherein the ferromagnetic media overcoat comprises carbon of a concentration graded across the vertical thickness of the ferromagnetic media overcoat, wherein the carbon concentration is higher toward an upper surface of the ferromagnetic media overcoat than toward a surface of the magnetic recording layer.
8. The method of claim 5, wherein the ferromagnetic media overcoat comprises a hard magnetic layer, or wherein the ferromagnetic media overcoat provides protection from head-disk contact.
9. The method of claim 5, wherein the depositing a ferromagnetic media overcoat comprises depositing a ferromagnetic media overcoat comprising a thickness of about 0.1-100 angstroms.
10. The method of claim 5, wherein the ferromagnetic media overcoat comprises a thickness of about 0.5-50 angstroms.
11. The method of claim 5 wherein the ferromagnetic media overcoat comprises Ni—Fe—C or Ni—Co—C.

* * * * *